(12) United States Patent
Cooper

(10) Patent No.: US 6,896,916 B2
(45) Date of Patent: May 24, 2005

(54) METHOD OF BAKING YEAST-FERMENTED FROZEN BREAD PRODUCTS

(75) Inventor: John Cooper, Daleville, VA (US)

(73) Assignee: Maple Leaf Baker Inc., Des Plaines, IL (US)

( * ) Notice: Subject to any disclaimer, the term of this patent is extended or adjusted under 35 U.S.C. 154(b) by 96 days.

(21) Appl. No.: 10/258,280

(22) PCT Filed: Oct. 18, 2002

(86) PCT No.: PCT/US02/33333

§ 371 (c)(1),
(2), (4) Date: Apr. 28, 2003

(87) PCT Pub. No.: WO2004/037003

PCT Pub. Date: May 6, 2004

(65) Prior Publication Data

US 2004/0076716 A1 Apr. 22, 2004

(51) Int. Cl.$^7$ .................................... A21D 8/06
(52) U.S. Cl. .................. 426/20; 426/549; 426/496
(58) Field of Search ................ 426/549, 551, 426/391, 446, 496, 502, 503, 504, 19, 20, 27

(56) References Cited

U.S. PATENT DOCUMENTS

| | | | |
|---|---|---|---|
| 4,374,151 A | | 2/1983 | Lindstrom et al. |
| 4,406,911 A | | 9/1983 | Larson et al. |
| 4,839,178 A | | 6/1989 | Seneau |
| 4,847,104 A | * | 7/1989 | Benjamin et al. ........... 426/549 |
| 4,861,601 A | | 8/1989 | Seneau |
| 4,966,778 A | | 10/1990 | Benjamin et al. |
| 5,094,859 A | | 3/1992 | Sluimer |
| 5,171,590 A | | 12/1992 | Sluimer |
| 5,254,351 A | | 10/1993 | de Boer et al. |
| 5,447,738 A | | 9/1995 | de Bruijne et al. |
| 5,451,417 A | | 9/1995 | Freyn et al. |
| 5,560,946 A | | 10/1996 | Sanders et al. |
| 5,589,207 A | | 12/1996 | Larsen et al. |
| 5,672,369 A | | 9/1997 | Lonergan et al. |
| 6,113,952 A | | 9/2000 | Vael |
| 6,579,554 B2 | | 6/2003 | Moder et al. |
| 6,589,583 B1 | | 7/2003 | Hansen et al. |
| 6,660,311 B2 | | 12/2003 | Goedeken et al. |

FOREIGN PATENT DOCUMENTS

| | | | | |
|---|---|---|---|---|
| DE | 43 20 050 | | 12/1994 | |
| EP | 0 311 240 | | 4/1989 | |
| EP | 0 653 163 | | 5/1995 | |
| FR | 2 481 072 | * | 10/1981 | ............ A21D/8/04 |
| FR | 2 589 043 | * | 4/1987 | ............ A21D/2/22 |

* cited by examiner

*Primary Examiner*—Keith Hendricks
(74) *Attorney, Agent, or Firm*—Marshall, Gerstein & Borun LLP

(57) ABSTRACT

A method of making a bread product comprising formulating and mixing a bread dough having flour as a major ingredient, and having the following additional ingredients, where percentages are based on the flour weight:

| Ingredients | % |
|---|---|
| Salt | 1.8–2.3 |
| Yeast | 3.0; 2.5–4.5 |
| Sweetener | 0.3–2.0 |
| Gluten | 0.5–4.0 |
| L-Cysteine | 10–100 PPM |
| Water | 50–65 |
| Oxidant | 0.1–0.5 |
| Enzymes | 0.01–0.5 |
| Gum | 0.01–0.5 | pre-forming the dough into open molds shaped suitably for the bread product;

pre-proofing the dough for less than 30 minutes in at least 70% relative humidity at a temperature in the range of 80° F. to 100° F.;

freezing the pre-proofed dough to a temperature below 0° C.;

partially defrosting the dough for a period of time of 60 minutes or less; and placing the partially defrosted dough in a pre-heated oven at a temperature of about 170° C. to 180° C. to produce the bread product in less than 3 hours.

11 Claims, No Drawings

METHOD OF BAKING YEAST-FERMENTED FROZEN BREAD PRODUCTS

This application is a 371 of PCT/US02/33333, filed Oct. 18, 2002.

FIELD OF THE INVENTION

The present invention is directed to yeast-fermented bread products and a method of baking the yeast-fermented bread products, that includes the steps of freezing the yeast-fermented bread dough, and then baking the yeast-fermented dough at a single temperature with an intermediate defrosting step that requires one hour or less with little to no additional proofing required between freezing and baking. More particularly, the yeast-fermented dough and process of baking the yeast-fermented dough, as described herein, unexpectedly provides freezer-to-oven yeast-fermented bread products that, from freezer-to-oven, requires no additional pre-fermenting, overnight retarding, complete thawing, or additional proofing and unexpectedly increases the shelf life of the bread products due to the increased amount of moisture retained in the bread products.

BACKGROUND ART

Fully Fermented Frozen (FFF) Dough

The products available to the consumer which are declared FFF are fully pre-proofed breads and rolls, meaning the production facility would blend materials, mix, shape, and fully proof the breads and rolls prior to freezing and boxing. The receiver of these FFF breads would then remove the breads from the frozen case, place them onto trays and bake them in a pre-set oven. The FFF baking is cycled in two stages:

1) Low temperature (325° F.) for 15 minutes to defrost.
2) High temperature (380° F.) for a further 20 minutes to complete the baking cycle.

Another type of freezer-to-oven (FTO) product would be laminated dough and pastries. This includes Danish type pastries and croissants. The products again are pre-shaped and fully proofed at the bakery operational unit. Lamination of the dough is a complex process which creates layers of fat between pure dough layers. Lamination by itself is a way of applying volume to a product during the final stages of baking. In essence the fat between the layers melts, the moisture released turns to steam and the steam trapped between the layers pushes the layers apart. This process creates a very open, thin cell structure typical of a Croissant or Danish type pastry.

Frozen Dough

Frozen Dough is pre-shaped bread or roll dough which has either undergone pre-shaping and or bulk sheeting at the manufacturing plant. Typically this type of dough requires a minimum of 2–3 hours defrost time prior to use. If the Frozen Dough has been pre-shaped, and depending on the unit weight, the dough would need to undergo a defrost cycle (time according to unit weight) and also a final proof cycle prior to bake off. Four to five hours of defrost and proof time would not be unusual for the receiver of the frozen dough.

Par Bake

Par Bake was developed in the early eighties to allow major retailers to bring freshly baked products to the consumer without the need to manufacture baked bread from scratch methods on site. These methods are costly and the industry innovated an alternative—that being Par Baked or partially baked bread. Typically these breads are mixed, pre-formed, proofed and partially baked at the manufacturer's site. The degree of baking is the only factor separating Par Baked from conventional, fully baked bread, both of which can be frozen and both can be defrosted and pre-heated. The cost of purchase from the retail, compared to in-store bakery, set up generated a significant saving in equipment, labor and waste for those currently making bread at the store level. The Par Bake bread products were merely taken from the freezer and baked, eliminating waste time and overhead from the store baker program.

SUMMARY OF THE INVENTION

The dough compositions and boxing process described herein provide ready to bake frozen fermented bread products (FROBAKE™) without the expected/required overnight retard or excessive defrost time. The FROBAKE™ units, when received frozen only require a minimal defrost time prior to bake off. Typically, 30 minutes defrost time is ideal for bread product units weighting less than 300 grams and 60 minutes for bread product units weighting 300 grams or more. The compositions and processes described herein are particularly suited for industrial bread product manufacture wherein frozen dough bread products are mass produced in minimum dough batches of about 400 pounds, producing at least 4,000 frozen bread product units/hour and generally up to bout 10,000 frozen bread product units/hour. The frozen dough units are then distributed frozen to multiple supermarkets and other sellers of the baked bread products, or can be sold frozen for others to bake on a smaller scale.

The defrost time is also lessened on those frozen bread product units like baguettes where the surface area is minimized due to the length of the dough piece. Thus a 500 gram frozen bread product unit measuring 8" length×3" wide–3" height would be classed as a large product and, thus, 60 minutes defrost would apply.

As another example, a long French stick measuring 21" length×1.5" width×1" high would still be classed as a large product, as defined by net dough weight. However, the defrost time would be reduced to 30 minutes based on the unit volume relative to defrost ratio (relative to depth and length) since defrosting is faster than for the same weight bread product unit that is shorter and deeper—the reduced defrost time is due to the thickness, or smallest dimension resulting in a shorter necessary defrost time.

FROBAKE™ products advantageously allow the receiver to take the frozen bread product units from their boxes, lay the units onto baking trays and within a one hour cycle have breads dressed, optionally scored and ready for the oven. The optional scoring technique is no different than when scoring a fully proofed conventional dough or a fully prepared frozen dough. The breads do not require any further defrost or fermentation prior to bake off. Usually the operator at the bake off site would moisten the breads with a water spray prior to dressing. This basically allows the dressing medium, be-it seed or cereal, to adhere evenly across the full upper surface of the dough. FROBAKE™ dough does not require moistening prior to dressing and can be dressed and scored without any form of moistener applied to the surface.

The bake off cycle for FROBAKE™ dough advantageously requires only a single temperature pre-set oven, preferably with steam injection at about 350° F. Most FFF or frozen dough require a two cycle bake off due to one stage (the first cycle) being defrost and the final, higher temperature cycle, being required to fully bake and color (dextrinate) the surface of the bread.

FROBAKE™ has unexpected additional advantages over frozen dough, FFF, and Par Bake in that at least double the normal shelf life is provided when packed in open paper bags or sealed plastic bags. This is due to the unexpected amount of moisture retained in the bread products after bake off, which migrates through the bread products upon cooling and displaying. Dehydration of moisture occurs rapidly in the Par Bake process due to the two baking cycles required. Typically 13% of the total moisture will be lost in the first bake cycle and a further 5% at the final bake off. FFF and frozen dough would lose about the same amount of moisture as Par Baked products due to the full cycle proof and defrost requirements of these prior art processes. FROBAKE™ loses less than about 10% of the dough moisture, usually about 6% of the dough moisture, as measured by weight loss at the end of the final bake cycle.

From a logistical standpoint, FROBAKE™ also provides a substantial decrease in freight costs in being able to maximize truck volumes unlike FFF and par bake which have a significantly greater specific volumes, as frozen.

FROBAKE™ dough produces bread products with excellent volume, open internal cell structure and flavor. The total process time from make through to final full bake takes approximately 2.2 hours as follows:

| Process Step | Time Required |
| --- | --- |
| 1) Line Processing | 30 Minutes |
| 2) In Line Blast Freezing (−30° F.) | 30 Minutes |
| 3) Defrost | 60 Minutes |
| TOTAL Prior Art Process | 2 Hours (120 Minutes) |
| Conventional Par Bake | 3.71 Hours (223 Minutes) |
| Frozen Dough | 9.3 Hours (includes a required minimal 8 hours retard time) |
| FFF Frozen Dough | 3 Hours |

Accordingly, one aspect of the bread products and methods described herein is to provide yeast-fermented bread products and a method of manufacturing the yeast-fermented bread products that includes the steps of freezing the yeast-fermented bread dough, and then baking the dough in a pre-heated oven with reduced defrost time required before baking.

Another aspect of the bread products and methods described herein is to provide yeast-fermented bread products and a method of manufacturing the yeast-fermented bread products that includes the steps of freezing the yeast-fermented bread dough, and then baking the dough in a pre-heated oven, after a 30–60 minute defrost time at room temperature, at a single temperature to provide bread products having an increased moisture content and increased shelf life.

Another aspect of the bread products and methods described herein is to provide yeast-fermented bread products and methods of manufacturing the yeast-fermented bread products that includes the steps of freezing the yeast-fermented bread dough, and then baking the dough with a defrost time less than 90 minutes, usually 30–60 minutes with little to no additional proofing required between freezing and baking.

Another aspect of the bread products and methods described herein is to provide a yeast-fermented bread product and a method of manufacturing the yeast-fermented bread products that includes the steps of freezing the yeast-fermented bread dough, and then baking the dough to provide freezer-to-oven bread products that, from freezer-to-oven, requires no additional pre-fermenting, overnight retarding, complete proofing, and/or additional proofing.

The above and other aspects and advantages of the yeast-fermented bread products and methods described herein will become more apparent from the following detailed description of the preferred embodiments.

DEFINITIONS

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

As employed herein, the term "fermentation" is meant to include all changes in the dough brought about by the action of yeast which functions to aerate a dough and ripen the gluten. Total fermentation time includes the time elapsed during fermentation of the dough in bulk, resting or benching and proofing. For the sake of clarity, traditional baking terminology is defined below and employed when appropriate to identify the specific dough treatment steps during which fermentation occurs.

"Fermentation in bulk" occurs after the dough formulation is mixed and before it is divided into separate portions.

"Partial defrost" occurs when the frozen dough is subjected to an ambient environment where it will undergo a level of defrost at room temperature (about 25° C.) for a period of time equal to 0.1 to 0.7 the time required to fully defrost the frozen dough and, thus, not "fully" thawing the frozen dough. It is preferred that the dough is defrosted about 15 to 50% of the time required to fully defrost the frozen dough at ambient conditions, e.g., about 25° C., and always has an internal core temperature below 0° C. when the bake process is initiated.

"Resting" is used interchangeably with "benching" to denote periods of time allowed to give the gluten of the flour time to recover from any step such as dividing, molding, forming, and the like, wherein the dough has been stretched or worked.

"Proofing" is the final step before baking or freezing wherein time is allowed for the yeast to produce more gas to give the correct volume and vesiculation to the molded or shaped dough portion.

A "leavening agent" is a compound or mixture of chemical compounds which produces carbon dioxide gas that functions to aerate baked products. Thus, in yeast fermented bread, yeast is a leavening agent.

The term "dough" comprises a mixture of flour with other ingredients stiff enough to knead or roll.

The term "yeast-fermented bread products" includes white, wheat, raisin and French-style or Italian-type breads, dinner-rolls or soft-rolls, hard rolls, Kaiser rolls, hamburger rolls, frankfurter rolls and other specialty rolls, rolled-in products such as Danish or puff pastry in either a pre-form or bulk or slab form, sweet yeast-raised dough items, such as cinnamon rolls, coffee cakes or other plain or filled sweet dough items, and yeast-raised dough for fried products, such as yeast-raised doughnuts.

PREFERRED EMBODIMENTS

The present invention may be understood more readily by reference to the following detailed description of the bread products and methods described herein and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

The commercial marketing of frozen dough for home baking or on-premises baking in supermarkets continues to grow in volume. Today's modern supermarkets and bakeries can provide freshly baked bread loaves, each day, to achieve the freshness sought by consumers. In the interest of providing many such fresh loaves of bread, and in the interest of reducing the time required to provide the fresh bread, most supermarkets have provided loaves of bread that are baked daily from frozen dough or partially baked frozen dough. The bread-making process using frozen dough, however, has several serious problems to be solved. Among them are the length of time required for the preparation and thawing of the frozen product before baking. As explained under "BACKGROUND ART", such freezer-to-oven bread products have required much longer defrost times between freezer and oven, longer baking times when inserted directly into a cold oven, partial baking prior to freezing, and/or two baking cycles at different temperatures for full defrosting and baking.

As an alternative to two baking cycles, including a first low temperature baking cycle for defrosting, others have placed the frozen dough directly from the freezer and placed it in a cold oven that is immediately turned on to a temperature of about 170° C.–180° C. for a period of 45–60 minutes (see U.S. Pat. Nos. 4,374,151; 4,406,911 and 4,966,778). Further, the prior art freezer-to-oven processes result in bread products with reduced moisture contents due to the dough composition and baking cycles used. Typical moisture contents for the bread products described herein are 50–65% by weight, whereas prior art freezer-to-oven bread products have moisture contents as follows: FFF: 45–55% by weight; Frozen Dough: 45–55% by weight; and Par Bake: 40–50% by weight.

In all cases, the moisture content of the bread products produced as described herein have a moisture content at least 5% more than the moisture content of the above-described prior art freezer-to-oven bread products, resulting in at least double the shelf-life.

The FROBAKE™ bread products described herein include the essential bread components of flour, salt, yeast and water. The flour can be wheat flour, rice flour, corn meal, or any other grain flour conventionally used in bread product dough. The preferred flour is wheat flour. However, the dough composition does not require a melting point depressant, such as $C_1$–$C_3$ monohydric alcohols, e.g., ethanol, or $C_2$–$C_3$ polyhydric alcohols (U.S. Pat. No. 4,374,151); or a high wheat protein level of at least 17%, based on the flour weight (U.S. Pat. No. 4,966,773); and can be placed directly into a pre-heated oven after 30–60 minutes of defrost at room temperature. The wheat protein level in the dough compositions described herein is about 10–16% by weight, preferably about 12% to 14.5%, based on the flour weight.

The dough compositions described herein are yeast-leavened at a yeast content of about 2.5% to 4.5%, preferably about 3.0%–4.0% by weight, based on the flour weight.

A preferred embodiment of this invention is a yeast-leavened dough which is proofed before freezing and held for baking at a later time which will maintain quality during normal commercial frozen storage temperature ranges, and can be conveniently prepared from the freezer to a finished baked loaf having good loaf volume and oven spring with a 30–60 minute defrost at room temperature prior to being inserted into an oven pre-heated to 170° C. to 180° C., for about 30–40 minutes, preferably about 175° C. for 35 minutes. This frozen dough, which is proofed before freezing, eliminates the usual thawing and proofing step, which usually requires 2–12 hours for the thawing and 2–4 hours for the proofing, before the dough is placed in the oven for baking.

The method of producing the frozen dough composition and bread products comprises the following steps: formulation; mixing, preferably at room temperature; pre-forming; pre-proofing for 10–20 minutes at 80° F. to 100° F. and 70–90% relative humidity; freezing below 0° C., preferably at −15° C. to −30° C.; partial defrosting, preferably at room temperature for 30–60 minutes; and then placing directly in a pre-heated oven at 170° C. to 180° C. for about 30–40 minutes, preferably including steam injection for 15–20 seconds to achieve 100% water saturation in the oven atmosphere.

The process and bread products have excellent volume, open internal cell structure and flavor. The total process time from make through to final full bake takes less than or equal to 2.7 hours, split out as follows:

Line Processing: 30 minutes
In line blast freezing to −30° F.: 30 minutes
Defrost: 30–60 minutes
Baking (directly in pre-heated oven): 30–40 minutes
Total: 2.0 to 2.7 hours Prior Art Time Required Conventional Par Bake time: 3.71 hours (223 minutes), prior to baking
Frozen Dough: 9.3 hours (includes a required minimal 8 hours retard time), prior to baking
FFF frozen dough: 3 hours, prior to baking Process Details
(1) Mixing—Spiral mixer twin arm/dual speed.
(2) The dough was mixed for 9 minutes in total at a temperature of 78° F.
(3) No rest was required prior to mechanical sheering and forming.
(4) The dough was divided into units weighting 500 grams+/−10 grams.
(5) Once divided, the dough is subjected to pre-forming through set molders before being automatically set into pre shaped baking pans.
(6) The filled pans travel along an automated belt to an online proofing box. The product is be subject to 15 minutes pre-proof at 90° F. with a chamber relative humidity of 85% prior to being deep frozen at −30° C.

Final test bakes where carried out in the baking oven at 350° F. for 35 minutes. To determine sufficient volume by baking, frozen dough blanks made under conventional methods were used in comparison to finished FROBAKE™ products. The following results were obtained:
Volume: Before baking/after baking/variance acceptability compared to frozen dough.
After 7 days freezer storage—Symmetrical appearance; Sustained volume loss: 0%.
After 14 days freezer storage—Symmetrical appearance; Sustained volume loss: −0.1%.

Rheological Mechanics

The process of a true freezer to oven yeast-fermented bread product refers to the minimizing of what is considered natural fermentation through yeast activity in the dough. Yeast levels determine the time and length of fermentation activity within a given formula. The FROBAKE™ formula requires a yeast level of 2.5 to 4.5% by weight, preferably 3.0 to 4.0% yeast level, based on the flour weight, is sufficient to create the desired volume and physical characteristics of a publicly perceived good loaf of bread both proportionately and gastronomically.

The fermentation methods applied to FROBAKE™ are physically controlled throughout the baking period of the breads, as opposed to the final proof periods standard on normal yeast-raised fermented bread products. The temperature range of 170° C. to 180° C. is important to control oven-forced fermentation which relies upon the formulation of a correct level of materials, including emulsifiers and enzymes, which become both activated and deactivated during specific bake time applied.

Yeast fermentation requires heat, time and temperature to evolve. Yeast fermentation also requires the breaking down of natural occurring sugars, i.e., sucrose, dextrose to obtain a desired level of yeast food along with the additional amylayses in the form of fungal and cereal enzymes to accelerate the gas production in the dough during the bake off. Additionally, it has been found that natural dough surface dextrination occurs more rapidly due to the minimized fermentation period applied to FROBAKE™, and residual sugars being more readily available for conversion.

The preferred FROBAKE™ formulation, based upon total flour weight, is as follows:

|  | % Preferred | % Range | % Preferred Range | Lbs | GMs |
|---|---|---|---|---|---|
| Wheat flour | 100 | 100 | 100 | 100 | 454 |
| Salt | 2.0 | 1.8–2.3 | 1.9–2.1 | 2 | 908 |
| Yeast | 3.0 | 2.5–4.5 | 3.0–4.0 | 3 | 363 |
| Dextrose* | 0.5 | 0.3–2.0 |  | 0.5 | 225 |
| Gluten | 1 | 0.5–4.0 | 1–3.0 | 1 | 454 |
| L-Cysteine | 30 PPM | 10–100 PPM | 10–50 PPM | trace | 000.03 |
| Improver† | 1 | 1–3 | 1–2 | 1 | 454 |
| Malt | 2 | 0–5 | 1–3 | 2 | 908 |
| Water | 58 | 50–65 | 50–60 | 58 | 360 |
| TOTAL | 167.5 |  |  | 167.5 | 2764 |

*Dextrose is the preferred sugar, but can be substituted with any other mono-or diglyceride to achieve a bread product having a greater or lesser sweetness, as follows:

Sugars    Sweetness Level

Sucrose    100
Fructose   140–150
dextrose*  70–75
corn syrup 65–70
Lactose    30–35
Maltose    30 to 35

†Provides .01–0.5%, preferably 0.1–0.3% based on flour weight, of an oxidant preferably selected from L-Ascorbic acid; ADA, Potassium Iodate, Calcium Iodate, and/or mixtures of any two or more of said oxidants.
†Provides .01–0.5%, preferably 0.1–0.3% based on flour weight, of an emulsifier or surfactant preferably selected from Calcium or Sodium Stearoyl Lactylate, e.g., SSL; a diacetyl ester of mono- and/or di-glycerides (e.g., DATEM, produced by esterification of monoacylglycerols and diacylglycerols with mono- and di-acetyltartaric acid); and/or an ethoxylated mono- and/or di-glycende.
†Provides one or more proteolytic and amolytic enzymes, each in amounts of 6 PPM to 500 PPM. Preferred enzymes are as follows:

Enzymes                  Preferred Dosage Levels alpha and beta Amylase   6–50 PPM
Endoxylanases            28–110 PPM
Fresh Enzymes            100–500 PPM
Protease                 100–250 PPM L-Cysteine a naturally occurring amino acid which is added to aid the dough in relaxing sufficiently during both dough make up and final bake also contributes to the weakening of the dough through reducing the gluten structure and enabling that structure to gain proportionate volume during the combined proof and bake while in the oven.

Having both starch attacking enzymes, referred to as amylases, and the reducing agent referred to as L-Cysteine is important since these functional materials, when combined, determine the overall external and internal appearance of the breads during both make up and bake off.

The flour is a standard roller milled patent flour and contains no additional enhancing materials with which to aid fermentation.

The non-diastatic Malt flour is a deactivated malt flour. Its function is purely to contribute malt flavor without breaking down additional starches to release more natural sugars. These flavors are very apparent in the final baked breads.

To achieve the full advantage of the present invention, the dough composition should include additives or conditioning agents including an oxidizing agent or oxidant, such as ascorbic acid; fungal and/or cereal enzymes; as well as one or more edible gums—each in an amount less than about 1% by weight, preferably 0.01–0.5%, preferably 0.1 to 0.3%, based on the flour weight. An oil, such as soybean oil may also be added in an amount of at least 0.01% up to about 0.5% based on the flour weight. Each of these additives can be added to the dough separately, or one or all of these additives can be combined by the addition of a dough conditioner, such as, a generic conditioner, or a specific dough conditioner, for example, containing an emulsifier, such as DATEM, an oil, such as soybean oil, an oxidant, such as ascorbic acid, and enzymes. Optionally, the conditioner can contain wheat flour, L-Cysteine, and other additives. The conditioners improve volume, crumb structure, flavor and shelf life.

Suitable food gums can be any food gum normally used in a frozen food product. Exemplary food gums including, but are not limited to, locust bean gum, quince gum, guar gum, gum tragacanth, gum arabic, ghatti, gum karaya, agar, xanthan gums, carrageenan, alginates, and similar food gums, and mixtures thereof. Guar gum and xanthan gums are preferred food gums.

The preferred ingredients are as follows:

Flour: Patent wheat flour produced for Maple Leaf Bakery is the material prepared from the milling and bolting of clean, sound 100% hard red spring wheat so that no less than 98% of the flour passes through a 212 micron cloth. The flour is unbleached. The flour may be enriched with niacin, iron, thiamin mononitrate, riboflavin and folic acid if necessary to satisfy the standards for Enriched Flour and entoleted just prior to packing.

Physical & Chemical Specifications

|  | Minimum | Maximum |
|---|---|---|
| Moisture | 13.60% | 14.00% |
| Protein (14% mb) | 12.80% | 13.20% |
| Ash (14% mb) | 0.50% | 0.54% |

Salt: Fine granulated salt with yellow prussiate is a screened, granular, white crystalline solid. It is manufactured by a vacuum pan evaporation system from saturated brine to which yellow prussiate has been added. The salt is dried and screened to insure uniformity of the crystalline form. It contains virtually no insolubles and dissolves quickly. It functions as a nutrient for yeast in the fermentation process and contributes to the overall flavor profile of the bread products which contain it. The yellow prussiate is added to improve the resistance of the salt to caking. It is somewhat hygroscopic and should be stored in a cool, dry place.

Physical & Chemical Specifications

| Purity (NaCl - dry basis) | 99.86% Minimum | |
|---|---|---|
| Granulation | Minimum | Maximum |
| On US # 30 Screen | 20% | 44% |
| On US # 40 Screen | 25% | 55% |
| On US # 50 Screen | 10% | 35% |
| On US # 70 Screen | — | 8% |
| Thru US # 70 Screen | — | 3% |

Yeast: Compressed Yeast compressed yeast that is a strain of *Saccharomyces cerevisiae* cultivated for uniformity, activity and stability. It is a leavening agent, which relies upon living cells to produce gas during fermentation. The cultured yeast is passed over a rotary vacuum dryer to reduce the moisture content. The yeast is subsequently extruded and formed into blocks for packing.

Physical & Chemical Specifications

| | Minimum | Maximum |
|---|---|---|
| Moisture | — | 72.0% |
| Protein | 14.0% | 19.0% |
| Total Ash (DB) | — | 6.0% |
| $CO_2$ Gassing Power Activity | 235 | 315 |
| Yeast Environment pH | 4.0 | 6.0 |

L-Cysteine: L-Cysteine (tablets) is a dough conditioner, which functions as a reducing agent in the dough composition. The material is a naturally occurring amino acid that functions as an enzyme, which decreases mixing time and improves the extensibility and machineability of dough. It comes in tablet form for convenient and accurate use and dissolves rapidly in water. Each tablet delivers 10 PPM of L-Cysteine monohydrochloride when added to 100 pounds of flour.

Physical & Chemical Specifications

| | Minimum | Maximum |
|---|---|---|
| Moisture | — | 0.7% |
| Tablet Weight | 1.90 g | 2.0 g |
| L-Cysteine HCL (per tablet) | 0.50 g | 0.50 g |

Wheat Gluten: Vital wheat gluten is a creamy tan colored powder produced by the low temperature drying of gluten extracted from wheat flour. The ingredient is used as a non-organic additive component in the dough composition.

Physical & Chemical Specifications

| | Minimum | Maximum |
|---|---|---|
| Moisture | — | 10.00% |
| Protein (14% mb) | 75.0% | — |
| Fat | — | 2.00% |
| Ash | — | 1.00% |
| Typical Granulation: (ROTAP - 100 g for 5 minutes) | | |
| Thru #40 Screen | 100% | — |
| Thru #60 Screen | 97% | — |
| Thru #100 Screen | 75% | — |

Dextrose: Dextrose is refined corn sugar in a crystalline form. it is prepared by the enzymatic hydrolysis of corn starch and refined by ion-exchange demineralization. It functions as a nutrient for yeast in the fermentation process, provides for mild sweetness, and assists in color development of the crust during baking. It is highly hygroscopic and should be stored in a cool dry place.

Physical & Chemical Specifications

| Appearance | Free Flowing Crystals |
|---|---|
| Color | White |
| Aroma | Sweet |
| Flavor | Cool, Bland and Sweet |
| Moisture | 8[,]5% Maximum |
| Purity | 99.7% Minimum |
| Ash | 100 PPM |
| Granulation | |
| Thru US# 16 Screen | 99% Minimum |

Malt Powder: Malt Powder is a non-diastatic natural product produced from barley and corn. The powder is produced by the enzymatic reaction of barley and corn grits. The material is a fine powder, which possesses a mellow sweet malt aroma and flavor. It is normally used in formulations to provide a sweet malt flavor, enhance the color of the crumb and crust, and act as humectants to extend shelf life.

Physical & Chemical Specifications

| | Minimum | Maximum |
|---|---|---|
| Moisture | 2.0% | 4.0% |
| Ash | 0.7% | 0.9% |
| Reducing Sugars (As Maltose) | 57.0% | 68.0% |
| Color Transmittance (at 570 mm) | 80.0 | 88.0 |
| pH | 5.5 | 6.2 |
| Granulation | | |
| Thru a US# 80 Screen | 92% | — |

Oxidant; Emulsifier; Enzymes; Oil: All can be added by incorporating a dough conditioner into the bread dough formulation. One such conditioner is PURATOS S® Improver. As an example of a suitable conditioner, PURATOS S® improver is a mixture of ingredients designed for use with yeast raised bakery products, namely, wheat flour, datum, soybean oil, dextrose, ascorbic acid, L-Cysteine, and enzymes. It is a dough conditioner which serves to improve volume, crumb structure, flavor and shelf life. The conditioners are formulated so that they may be used at a level equal to 1% to 2% of flour weight.

The PURATOS S® conditioning composition used at 1–2% based on the flour weight, has a multifunctional role in that it contains balanced micro ingredients, namely:
Dry flour (carrier)
Dextrose (Sugar)
Datem ester (Emulsifier)
Enzymes (proteolytic and amylolytic)
Fats
Oils
Ascorbic acid (oxidizing agent)

What is claimed is:

1. A method of making a bread product comprising formulating and mixing a bread dough having flour as a major ingredient, and having yeast, flour, salt and water comprising:
   blending and mixing the dough;
   pre-forming the dough into open molds shaped suitably for the bread product;
   pre-proofing the dough for less than 30 minutes in at least 70% relative humidity at a temperature in the range of 80° F. to 100° F.,
   freezing the pre-proofed dough to a temperature below 0° C.;
   partially defrosting the dough for a period of time of 60 minutes or less; and
   placing the partially defrosted dough in a pre-heated oven at a single temperature in the range of about 170° C. to 180° C. to produce the bread product in less than 3 hours leaving the bread product with at least 50% water.

2. A method in accordance with claim 1, wherein the dough is pre-proofed for 15–20 minutes at 70–90% relative humidity.

3. A method in accordance with claim 2, wherein the partially defrosted dough is baked at 170° C. to 180° F. for 30–40 minutes in a water-saturated oven atmosphere.

4. A method in accordance with claim 1, wherein the bread product comprises a sweetener selected from the group consisting of a monosaccharide, a disaccharide, and a mixture thereof.

5. A method in accordance with claim 4, wherein the sweetener is selected from the group consisting of dextrose, sucrose, fructose, corn syrup, lactose, maltose, and a mixture of any two or more thereof.

6. A method in accordance with claim 1, wherein the bread product comprises an enzyme selected from the group consisting of alpha amylases, beta amylase, an endoxylanase, a fresh enzyme, protease and a mixture of any two or more of said enzymes.

7. A method in accordance with claim 1 comprising blending and mixing the dough within a temperature ramge of about 74° F. to about 80° F.; and allowing the dough to proof for 15–20 minutes at 80° F. to 100° F. and at a relative humidity of 70–90% before freezing the dough; freezing the dough; and then baking the partially defrosted dough in a single baking cycle, at a single temperature.

8. A method in accordance with claim 7, wherein the dough comprising the following composition:

| salt | 1.8–2.3% |
| leavening agent | 2.5–4.5% |
| emulsifier | 0.01 to 0.5% |
| sweetener | 0.3–2.0% |
| L-Cysteine | 0.001–0.1% |
| gluten | 0.5–4.0% |
| oxidant | 0.01–0.5% |
| enzymes | 0.01–0.5% |
| water | 58–65% |
| gum | 0.01–0.5%. |

9. A method in accordance with claim 7 wherein the dough is defrosted for 30 to 60 minutes and has the following composition:

| Ingredients | % |
| --- | --- |
| Salt | 1.8–2.3 |
| Yeast | 2.5–4.5 |
| Sweetener | 0.3–2.0 |
| Gluten | 0.5–4.0 |
| L-Cysteine | 10–100 PPM |
| Water | 50–65 |
| Oxidant | 0.1–0.5 |
| Enzymes | 0.01–0.5 |
| Gum | 0.01–0.5. |

10. A method in accordance with claim 9, wherein baking includes steam injection and the dough is baked at a temperature of about 175° C. to 178° C.

11. A method in accordance with claim 7, wherein the frozen dough is defrosted at a temperature of about 75–80° F.

* * * * *

UNITED STATES PATENT AND TRADEMARK OFFICE
CERTIFICATE OF CORRECTION

PATENT NO. : 6,896,916 B2  Page 1 of 1
APPLICATION NO. : 10/258280
DATED : May 24, 2005
INVENTOR(S) : John Cooper It is certified that error appears in the above-identified patent and that said Letters Patent is hereby corrected as shown below:

On title page (item 73)
In the Assignee, please delete "Baker" and insert --Bakery--.

Column 12, Line 2
In Claim 7, line 2, "ramge" should be --range--.

Signed and Sealed this

Fourteenth Day of November, 2006

JON W. DUDAS
*Director of the United States Patent and Trademark Office*